Jan. 21, 1969  M. R. ROYCE  3,423,621
COLOR PICTURE DISPLAY CONTAINING A RED-EMITTING
EUROPIUM-ACTIVATED YTTRIUM OXYSULFIDE PHOSPHOR
Original Filed March 7, 1966

INVENTOR.
MARTIN R. ROYCE
BY
L. Greenspan
Attorney

United States Patent Office 3,423,621
Patented Jan. 21, 1969

3,423,621
COLOR PICTURE DISPLAY CONTAINING A RED-EMITTING EUROPIUM-ACTIVATED YTTRIUM OXYSULFIDE PHOSPHOR
Martin R. Royce, Lancaster, Pa., assignor to Radio Corporation of America, a corporation of Delaware
Continuation of abandoned application Ser. No. 559,356, Mar. 7, 1966. This application May 3, 1966, Ser. No. 547,294
U.S. Cl. 313—92     6 Claims
Int. Cl. H01j 29/18

ABSTRACT OF THE DISCLOSURE

A color picture display device, typically a cathode ray tube, including luminescent means comprised of a blue-emitting phosphor, a green-emitting phosphor and a red-emitting phosphor, and means for selectively exciting each of these phosphors with electrons. The red-emitting phosphor is a europium-activated yttrium oxysulfide.

CROSS-REFERENCE TO RELATED APPLICATION

Figure 1:
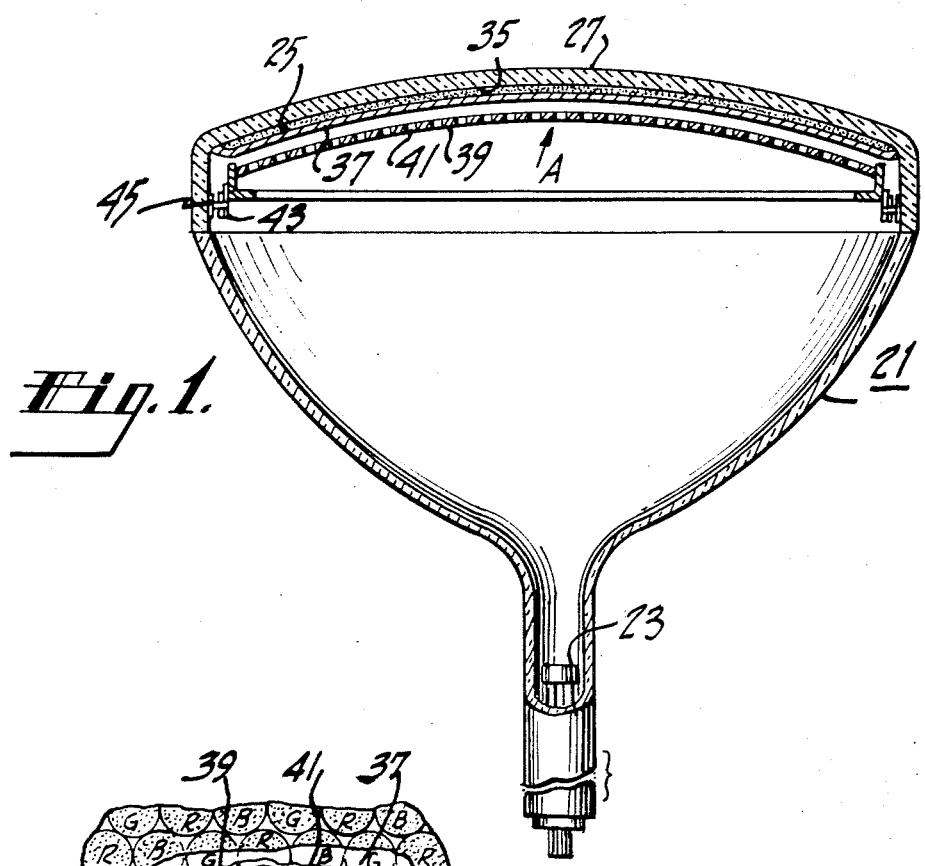

This application is a continuation of Ser. No. 559,356, filed Mar. 7, 1966, now abandoned.

BACKGROUND OF THE INVENTION

This invention relates to a novel color picture display, and particularly to a novel picture tube for color television.

Commercial picture tubes for color television, or color kinescopes as they are sometimes called, are cathode ray tubes which include a viewing screen comprised generally of a multiplicity of red-emitting, green-emitting and blue-emitting phosphor elements. These elements are usually arranged on the inner surface of the faceplate of the picture tube in a regular cyclic array. In the shadow mask type picture, the phosphor elements are usually dots arranged in groups of threes or triads, each triad having a red-emitting dot, a green-emitting dot, and a blue-emitting dot. There are, of course, other geometrical arrangements and shapes of phosphor elements for other cathode ray tube types.

In any of these arrangements, the production of color pictures with good fidelity, though simple in principle, becomes complicated when it is realized that the phosphor elements are not identical in brightness or decay characteristics, and that the human eye does not respond equally to the three colors at equivalent absolute brightnesses. In order to compensate for these differences, the system is adjusted to produce the desired effect. For example, in present commercial shadow-mask type kinescopes, of the white light energy in the viewed image produced on the screen, about 60 percent of the energy is contributed from the green-emitting phosphor, about 20 percent from the blue-emitting phosphor and about 20 percent from the red-emitting phosphor. This imbalance of the contributions usually requires unequal cathode beam currents for exciting the three colors and a relatively high total beam current.

The choice of phosphors is limited by the requirement that the phosphors be matched as to several characteristics. One of these characteristics is luminescence decay. Where luminescence decay is not matched, the viewed image is disturbed by color trails behind moving objects. Also, the combination of phosphors should be matched to provide an adequate color gamut, so that an adequate range of faithful colors can be produced to provide a pleasing effect to the viewer.

The choice of phosphors for color kinescopes is further limited by the requirement that the phosphors be chemically stable to the processes used to manufacture the kinescopes, and to the operational conditions encountered over years of use. Many phosphors, which might otherwise be used, are not used because their luminescence characteristics deteriorate during manufacture or use.

Over the years of commercial manufacturing, the blue-emitting phosphor has been zinc sulfide with silver activator and has remained substantially unchanged. This blue-emitting phosphor has a moderate decay, a high color saturation, good chemical stability, and a high brightness, offsetting the relatively low efficiency of the human eye to blue light.

The green-emitting phosphor has undergone two important changes. The zinc orthosilicate with manganese activator originally used was modified to shorten its decay at least to avoid the phenomenon known as green-trailing. Subsequently, this modified phosphor was replaced with zinc-cadmium sulfide with silver activator which produces brighter images on the viewing screen without green-trailing, has adequate color saturation, and adequate chemical stability.

The red-emitting phosphor has been a problem over all of the years, partly because of the relatively low efficiency of the human eye to red light, and partly because of the many other requirements, such as adequate chemical stability, suitable decay of luminescence, and adequate brightness. The red-emitting phosphor has been replaced many times. Cadmium borate with manganese activator, which had an orange emission color, and poor chemical stability, was replaced with zinc orthophosphate with manganese activator; which in turn was replaced with zinc-cadmium sulfide with silver activator, which is brighter and has better chemical stability. This red-emitting sulfide phosphor has been replaced with yttrium orthovanadate with europium activator, which is brighter and is more stable chemically than the red-emitting sulfide phosphor.

Nevertheless, none of these prior red-emitting posphors, nor the many other red-emitting phosphors that have been tried experimentally, is completely satisfactory in a viewing screen for a color television picture tube. In each case, the red-emitting elements require, in practice, a markedly higher beam current for equivalent brightnesses than the green-emitting or blue-emitting elements. As a result, the system requires also a relatively high total beam current.

An object of this invention is to provide a novel color picture display.

Another object is to provide a cathode ray tube having a luminescent screen comprising red-emitting, green-emitting and blue-emitting elements in which the beam currents required to produce a given brightness and shade of white are more nearly equal than for previous screens of this type.

A further object is to provide a luminescent screen for a color kinescope in which the total beam current required in practice to produce a given brightness and shade of white is lower than for previous screens, or which can be operated at the total beam current previously used to produce a white of greater brightness.

In general, the novel color picture display includes luminescent means comprising a blue-emitting phosphor, a green-emitting phosphor, and a red-emitting phosphor, the red-emitting phosphor consisting essentially of yttrium oxysulfide with europium activator, and means for selectively exciting said phosphors with electrons. It is preferred to use $Y_2O_2S$ with 2.5 to 5.5 mol percent europium. Luminescent means utilizing this particular combination of phosphors are superior to previous such means by requiring a lower power input for a given brightness and shade of white light in the viewed image, and by producing a brighter white for the same power input previously used.

For commercial direct-view color picture tubes, this particular group of red-emitting phosphors is more compatible with respect to both luminescent and chemical characteristics with the usable green-emitting and blue-emitting phosphors for these structures. As a result, the novel kinescopes and viewing screens can use more nearly equal beam currents for the color phosphor elements to produce a given brightness and shade of white emission, and require less total beam current than previously used to produce a given brightness level of white emission. In addition, for the same total beam current previously used, a higher brightness of white is produced.

Figure 2:
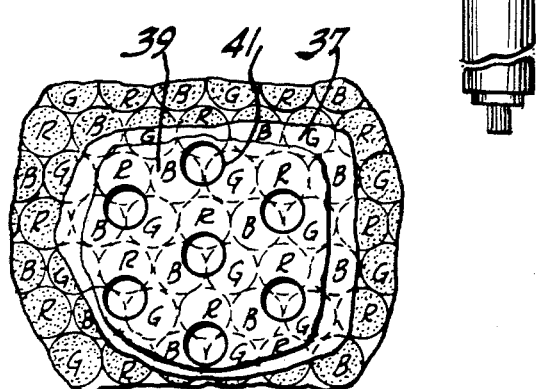

In the drawing, FIGURE 1 is a sectional view of a three-gun tri-color cathode ray tube of the shadow mask dot screen variety, and FIGURE 2 is a fragmentary rear elevational view of the screen structure of the tube of FIGURE 1, viewed in the direction of the arrow A, showing a conventional hexagonal pattern of mask apertures and color dots.

The novel combination of phosphors may be used in any of the three-color viewing screens used in any of the known color kinescope types. Thus, for example, the combination of phosphors may be used in viewing screens of the focus mask type, the focus grill type, the penetration type, the projection type, the line screen sensing type, and the shadow mask type kinescopes of the single gun and multiple gun types. Since all combinations of three phosphors for color television are designated as P-22 screens in the art, the novel combinations disclosed herein may also be so designated. The screens may be constituted of phosphor elements such as layers, lines or dots and may include elements which are white-emitting.

The novel cathode ray tubes and luminescent screens may be fabricated by any of the known processes for this purpose. The phosphor elements may be produced, for example, by silk-screening or photographic deposition. In using photographic deposition, the phosphor particles may be included in a photoresist composition. The phosphor-photoresist composition is sprayed or slurried or otherwise coated upon the inner surface of the faceplate of a cathode ray tube or other support, the coating dried, the dry coating exposed to a pattern of light, and then the exposed coating developed. Alternatively, the photoresist composition (without phosphor) may be sprayed, slurried or otherwise coated on the support, the coating dried, the dry coating exposed to a pattern of light and then the exposed coating developed. The phosphor may be applied, as by settling or dusting, to the coating either before exposure, between exposure and development, or after development. After the phosphor elements have been deposited, the screen is filmed and aluminized in the usual way. The screen is then baked-out and assembled with electron guns and the masks, grills and electrodes as required in an envelope, usually of glass. The assembled tube is baked-out, evacuated, and sealed. In some processes, the bake-out step after aluminizing is omitted.

A preferred embodiment of the invention illustrated in FIGURES 1 and 2 is for a conventional shadow mask type kinescope structure which is comprised of a glass envelope 21 having three electron guns 23 at one end thereof adapted to project three electron beams at a target structure at the opposite end of the envelope 21. The target structure includes a luminescent viewing screen 25 supported on a glass faceplate 27, which faceplate is part of the envelope 21. The screen 25 is comprised of a multiplicity of red-emitting, green-emitting, and blue-emitting phosphor dots R, G, and B respectively, adhered to the inner surface 35 of the faceplate 27. The dots are arranged in a regular repetitive order of triads of three dots, one dot being of each color emission characteristic. The dot structure is overlaid with a reflective coating 37 of aluminum. Closely spaced from the faceplate 27 toward the guns 23 is a metal shadow mask 39 having a multiplicity of apertures 41 therein, one aperture for each triad. The mask is supported from three springs 43 attached to the mask 39 on studs 45 attached to the envelope 21. The shadow mask 39 is so positioned between the guns 23 and faceplate 27 that, during operation, an electron beamlet from each of the three beams passes through each aperture of the shadow mask 39 at a slightly different angle and excites a different one of the three dots of a triad. Thus, the electron beam from the first gun can excite all of the red-emitting dots, the electron beam from the second gun can excite all of the green-emitting dots, and the electron beam from the third gun can excite all of the blue-emitting dots. Herein, the currents of these beams may be referred to as the red beam current, the green beam current, and the blue beam current, respectively. The total beam current is the sum of the red, the green, and the blue beam currents.

The blue-emitting elements preferably consist essentially of zinc sulfide with about 0.015 weight percent silver activator. The activator content may be in the range of 0.005 to 0.030 weight percent silver. Other blue-emitting phosphors whose characteristics are essentially the same as those of the foregoing blue-emitting phosphors may also be used. Such blue-emitting elements have a luminous efficiency in the range of 3 to 15 lumens/watt and a persistance in the range of 10 to 1000 microseconds.

The green-emitting elements preferably consists essentially of zinc cadmium sulfide with about 0.008 weight percent silver activator and a weight ratio of ZnS/CdS of about 60/40. The molar formula of this phosphor is approximately $0.69ZnS \cdot 0.31CdS:Ag(0.008)$. The activator content of this phosphor may be in the range of 0.0005 to 0.100 weight percent of the phosphor. The weight ratio of ZnS/CdS of suitable green-emitting zinc cadmium sulfides may be in the range of 55/45 to 65/35. Other green-emitting phosphors with characteristics which are essentially the same as those of the foregoing green-emitting phosphors may be used. Such green-emitting elements have a luminous efficiency in the range of 20 to 100 lumens/watt and a persistance in the range of 10 to 1000 microseconds.

The red-emitting elements preferably consist essentially of yttrium oxysulfide with about 5.0 mol percent europium. This phosphor has the molar formula $$Y_{1.90}Eu_{0.10}O_2S$$

since the europium content is 5 mol percent of the content of yttrium plus europium. The activator, i.e., Eu, content of this phosphor may be in the range of 2.5 to 5.5 mol percent of the content of yttrium plus europium. At 2.5 to 3.0 mol percent europium, the phosphor is brighter and is slightly less red; whereas at 5.0 to 5.5 mol percent, the phosphor is redder but slightly less bright. Upon excitation with an electron beam, the phosphor luminesces with a red-emission color. The phosphor is a line emitter type of phosphor with a principal emission peak at about 6260 A. and with a strong minor peak at about 6175 A. With about 5.0 mol percent europium, the CIE coordinates of the phosphor are about $x=0.675$ and $y=0.325$. With about 3.0 mol percent europium, the CIE coordinates of the phosphor are about $x=0.663$ and $y=0.337$.

A red-emitting phosphor having 5.0 mol percent europium may be prepared by the following process, although alternative processes may be used. Dissolve about 214 grams of yttrium oxide and 17.60 grams of europium oxide in nitric acid and dilute with water to a volume of about 3500 ml. Add to the nitrate solution with constant stirring about 2300 ml. of a 10 percent solution of oxalic acid, whereby a co-precipitate of yttrium and europium oxalates is formed. Filter the co-precipitate and then wash and dry the co-precipitate. Heat the dry co-precipitate in air at about 1250° C. for about one hour to convert the co-precipitate to a mixed oxide. Then, heat the mixed oxide in an atmosphere of flowing hydrogen sulfide at about 1100° C. for about one hour and then cool to room temperature. The product has a light body color and the empirical formula $Y_{1.90}Eu_{0.10}O_2S$ as evidenced by chemical and X-ray analysis. This phosphor is referred to herein as yttrium oxysulfide with 5.0 mol percent europium.

Part of the improvement in the screen performance of the novel color television viewing screen described herein is achieved because the family of red phosphors produces luminescent elements having an unusual and unexpected combination of characteristics. First, the emission color is in a suitable area in the CIE diagram. Second, the cathodoluminescence of the elements is not degraded substantially by ordinary processes used to fabricate the cathode ray tube. Third, the decay of luminescence of elements of this phosphor compares favorably with elements of the usable green-emitting and blue-emitting phosphors. Fourth, the phosphors are chemically stable so that they can withstand manufacturing processes and relatively long periods of use without substantial deterioration of the luminescent characteristics. And fifth, the phosphors can be made economically in a convenient range of particle sizes.

Part of the improvement in the screen performance is achieved because elements of the red-emitting phosphors also have emission characteristics which, in combination with the characteristics of elements of the usable green-emitting and blue-emitting phosphors, interact to produce an overall improvement in the luminance of the screen, coupled with an adequate color gamut.

One way of comparing the luminance for three-phosphor element combinations is to compare the actual individual and total beam currents in microamperes required to produce a luminance level of 8 foot-lamberts of a shade of white light which is defined by the brightness color temperature of 9300° K. plus 27 M.P.C.D.'s The table below summarizes the beam currents for several different P–22 screens in 19 inch kinescopes. The designation P–22 was assigned by the Joint Electron Devices Engineering Council (JEDEC) to define the luminescence characteristics of the phosphor elements for three-phosphor color picture tube viewing screens. In the table, the approximate molar formulas of the sulfide blue-emitters are ZnS:Ag(0.015), of the sulfide green-emitters are 0.69ZnS·0.31CdS:Ag(0.008), of the sulfide red-emitter is 0.24ZnS·0.76CdS:Ag(0.002), which has a weight ratio of ZnS/CdS of 17.5/82.5, of the vanadate red is $$Y_{0.95}Eu_{0.05}VO_4$$

and of the oxysulfide red is $Y_{1.90}Eu_{0.10}O_2S$.

The table evidences the reduced red beam current and total gun current required by the screen with elements of oxysulfide red-emitting phosphor. The screen with the oxysulfide red-emitting phosphor required 52 microamperes of red beam current compared with 70 microamperes required for the screen with elements of vanadate red-emitting phosphor and 81 microamperes required for the screen with elements of sulfide red-emitting phosphor. The total beam current was also correspondingly lower. Similar screens with elements of oxysulfide red-emitting phosphor but with lower europium content require still lower red beam current.

A comparison of color gamuts is also described by Austin E. Hardy, RCA Engineer, 11, 12–15 (1965). The subjective quality of color is well-known. The red-emitting elements for a color television viewing screen must have an emission color which, in combination with green-emitting elements and blue-emitting elements, is subjectively acceptable to the viewer. Red-emitting elements of the novel luminescent means have an emission color which falls approximately on a line in the CIE diagram between that of red-emitting zinc-cadmium sulfide with silver activator and that of red-emitting zinc orthophosphate with manganese activator. The emission color can be tailored by adjusting the proportion of europium present in the yttrium oxysulfide phosphor. With about 5.0 mol percent of europium present, the emission color of the red-emitting element is at about that of elements of yttrium vanadate with 5.0 mol percent europium and elements thereof require a lower beam current than that required by elements of vanadate phosphor. With about 3 mol percent europium present, the emission color of red-emitting elements is at about that of elements of the red-emitting sulfide phosphor and elements thereof, require a still lower beam current than that required by elements of the vandadate phosphor.

TABLE

| P-22 screen type, blue/green/red | Gun currents in μA for white luminance=8fL [1] | | | |
|---|---|---|---|---|
| | Blue | Green | Red | Total |
| Sulfide/sulfide/sulfide [2] | 39 | 54 | 81 | 174 |
| Sulfide/sulfide/vanadate (5.0% Eu) | 39 | 54 | 70 | 163 |
| Sulfide/sulfide/oxysulfide (5.0% Eu) [3] | 38 | 53 | 52 | 143 |

[1] Gun currents for 19″ color kinescopes of shadow mask type with 16.2% transmission through mask.
[2] Gun currents normalized from currents on 21″ kinescope.
[3] Gun currents normalized from currents on 19″ kinescope with 15% transmission through mask.

What is claimed is:

1. A color picture display including luminescent means comprising a blue-emitting phosphor, a green-emitting phosphor and a red-emitting phosphor, said red-emitting phosphor being yttrium oxysulfide with europium activator, and means for selectively exciting each of said phosphors with electrons.

2. A cathode ray tube including luminescent means comprising a blue-emitting phosphor having a luminous efficiency in the range of 3 to 15 lumens/watt and a persistence in the range of 10 to 1000 microseconds, a green-emitting phosphor having a luminous efficiency in the range of 20 to 100 lumens/watt and a persistence in the range of 10 to 1000 microseconds, a red-emitting phosphor consisting essentially of yttrium oxysulfide with about 2.5 to 5.5 mol percent europium activator, and means for selectively exciting each of said phosphors with electrons to produce an image.

3. A luminescent screen for color television comprising a substrate having on a surface thereof a multiplicity of red-emitting, green-emitting and blue-emitting phosphor elements, the red-emitting elements consisting essentially of yttrium oxysulfide with europium activator.

4. A cathode ray tube including a luminescent viewing screen comprising a substrate having, on a surface thereof, a multiplicity of groups of discrete phosphor elements, each of said groups consisting of a red-emitting element of which the phosphor is red-emitting yttrium oxysulfide with europium activator, a green-emitting element of which the phosphor is zinc cadmium sulfide with silver activator, and a blue-emitting element of which the phosphor is zinc sulfide with silver activator, and means for selectively exciting each of said elements with electrons.

5. A cathode ray tube including an evacuated envelope, a luminescent screen within said envelope, said screen comprising a multiplicity of red-emitting, green-emitting and blue-emitting phosphor elements arranged in a regular repetitive array, said red-emitting elements consisting essentially of yttrium oxysulfide with about 2.5 to 5.5 mol percent europium activator, the green-emitting elements consisting essentially of zinc cadmium sulfide with about 0.0005 to 0.10 weight percent silver activator, and the blue-emitting elements consisting essentially of zinc sulfide with about 0.005 to 0.030 weight percent silver activator, and means for selectively exciting each of said elements with electrons.

6. A cathode ray tube including an evacuated envelope, a luminescent screen within said envelope on a surface thereof, said screen comprising an array of red-emitting, green-emitting and blue-emitting phosphor elements arranged in a regular repetitive order, the red-emitting elements consisting essentially of yttrium oxysulfide with about 5.0 mol percent europium activator, the green-emitting elements consisting essentially of zinc cadmium sulfide with about 0.008 weight percent silver activator, and the blue-emitting elements consisting essentially of zinc sulfide with about 0.015 weight percent silver activator, and electron beam producing means for selectively exciting each of said red-emitting, green-emitting and blue-emitting phosphor elements.

References Cited

UNITED STATES PATENTS 3,250,722 5/1966 Borchardt _____ 252—301.5
3,243,625 3/1966 Levine et al. _____ 313—92

FOREIGN PATENTS 6,610,614 1/1968 Netherlands.
1,347,458 11/1963 France.

JAMES W. LAWRENCE, *Primary Examiner.*

V. LAFRANCHI, *Assistant Examiner.*

U.S. Cl. X.R.

252—301.4

Disclaimer 3,423,621.—*Martin R. Royce*, Lancaster Pa. COLOR PICTURE DISPLAY CONTAINING A RED-EMITTING EUROPIUM-ACTIVATED YTTRIUM OXYSULFIDE PHOSPHOR. Patent dated Jan. 21, 1969. Disclaimer filed Sept. 24, 1969, by the assignee, *RCA Corporation*.

Hereby disclaims the terminal portion of the term of the patent subsequent to Dec. 24, 1985.

[*Official Gazette November 4, 1969.*]

Dedication 3,423,621.—*Martin R. Royce*, Lancaster, Pa. COLOR PICTURE DISPLAY CONTAINING A RED-EMITTING EUROPIUM-ACTIVATED YTTRIUM OXYSULFIDE PHOSPHOR. Patent dated Jan. 21, 1969. Dedication filed May 13, 1974, by the assignee, *RCA Corporation*.

Hereby dedicates the entire remaining term of said patent to the Public.

[*Official Gazette April 29, 1975.*]